US008898691B2

(12) United States Patent
Coldwell

(10) Patent No.: US 8,898,691 B2
(45) Date of Patent: Nov. 25, 2014

(54) CONTROL OF ACCESS TO MULTIMEDIA CONTENT

(75) Inventor: Robert Coldwell, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 829 days.

(21) Appl. No.: 11/862,949

(22) Filed: Sep. 27, 2007

(65) Prior Publication Data

US 2009/0089825 A1 Apr. 2, 2009

(51) Int. Cl.
*H04N 7/16* (2011.01)
*H04N 7/173* (2011.01)
*H04N 21/643* (2011.01)
*H04L 12/66* (2006.01)
*H04N 21/258* (2011.01)

(52) U.S. Cl.
CPC ..... *H04N 7/17318* (2013.01); *H04N 21/64322* (2013.01); *H04L 12/66* (2013.01); *H04N 21/25816* (2013.01)
USPC .............................................. 725/25; 725/38

(58) Field of Classification Search
USPC .......................................... 725/25, 27–30, 38
See application file for complete search history.

(56) References Cited

U.S. PATENT DOCUMENTS

| 5,382,983 | A | * | 1/1995 | Kwoh et al. | 348/716 |
|---|---|---|---|---|---|
| 5,682,511 | A | | 10/1997 | Sposato et al. | |
| 5,850,218 | A | | 12/1998 | LaJoie et al. | |
| 6,177,931 | B1 | * | 1/2001 | Alexander et al. | 725/52 |
| 6,426,705 | B1 | | 7/2002 | Wischoeffer | |
| 6,434,150 | B1 | | 8/2002 | Bog et al. | |
| 6,493,876 | B1 | | 12/2002 | DeFreese et al. | |
| 6,701,523 | B1 | * | 3/2004 | Hancock et al. | 725/25 |
| 6,772,433 | B1 | | 8/2004 | LaJoie et al. | |
| 8,225,345 | B2 | * | 7/2012 | Sahasrabudhe et al. | 725/30 |
| 2004/0049785 | A1 | | 3/2004 | Grzeczkowski et al. | |
| 2004/0117831 | A1 | * | 6/2004 | Ellis et al. | 725/53 |
| 2011/0209180 | A1 | * | 8/2011 | Ellis et al. | 725/42 |

* cited by examiner

*Primary Examiner* — Olugbenga Idowu
(74) *Attorney, Agent, or Firm* — Jackson Walker L.L.P.

(57) ABSTRACT

A disclosed method of enabling a subscriber to control access to multimedia content received from a multimedia distribution network includes provisioning the network with an access control application. The application is operable to respond to an invocation by a member of a subscriber class by enabling at least one subscriber class function, wherein the subscriber class function enables the subscriber class member to define an access restriction for members of a controlled class. The application responds to an invocation by a member of the controlled class by enabling the controlled class member to access content not subject to the defined restrictions permitting the controlled class member to define preferences from content not subject to the defined restrictions. The definable preferences may include TV channel preferences and interactive games preferences. Restrictions may be defined based on channel identification, a rating associated with requested content, an elapsed viewing time, and a monetary charge.

17 Claims, 4 Drawing Sheets

CONTROL OF ACCESS TO MULTIMEDIA CONTENT

BACKGROUND

1. Field of the Disclosure

The present disclosure generally relates to multimedia content distribution networks, and more particularly, to controlling access to content provided by such networks.

2. Description of the Related Art

In the field of subscription-based multimedia distribution networks, subscribers generally desire the ability to control access to the content that is offered so that, for example, the subscriber's children do not have access to content that is inappropriate for them. While channel blocking and ratings-based blocking are available to implement a blunt form of access control, these techniques are inflexible and imprecise.

BRIEF DESCRIPTION OF THE DRAWINGS

Aspects of example embodiments are illustrated in the accompanying drawings, in which like references indicate similar elements, and in which.

DESCRIPTION OF THE EMBODIMENT(S)

Figure 1:
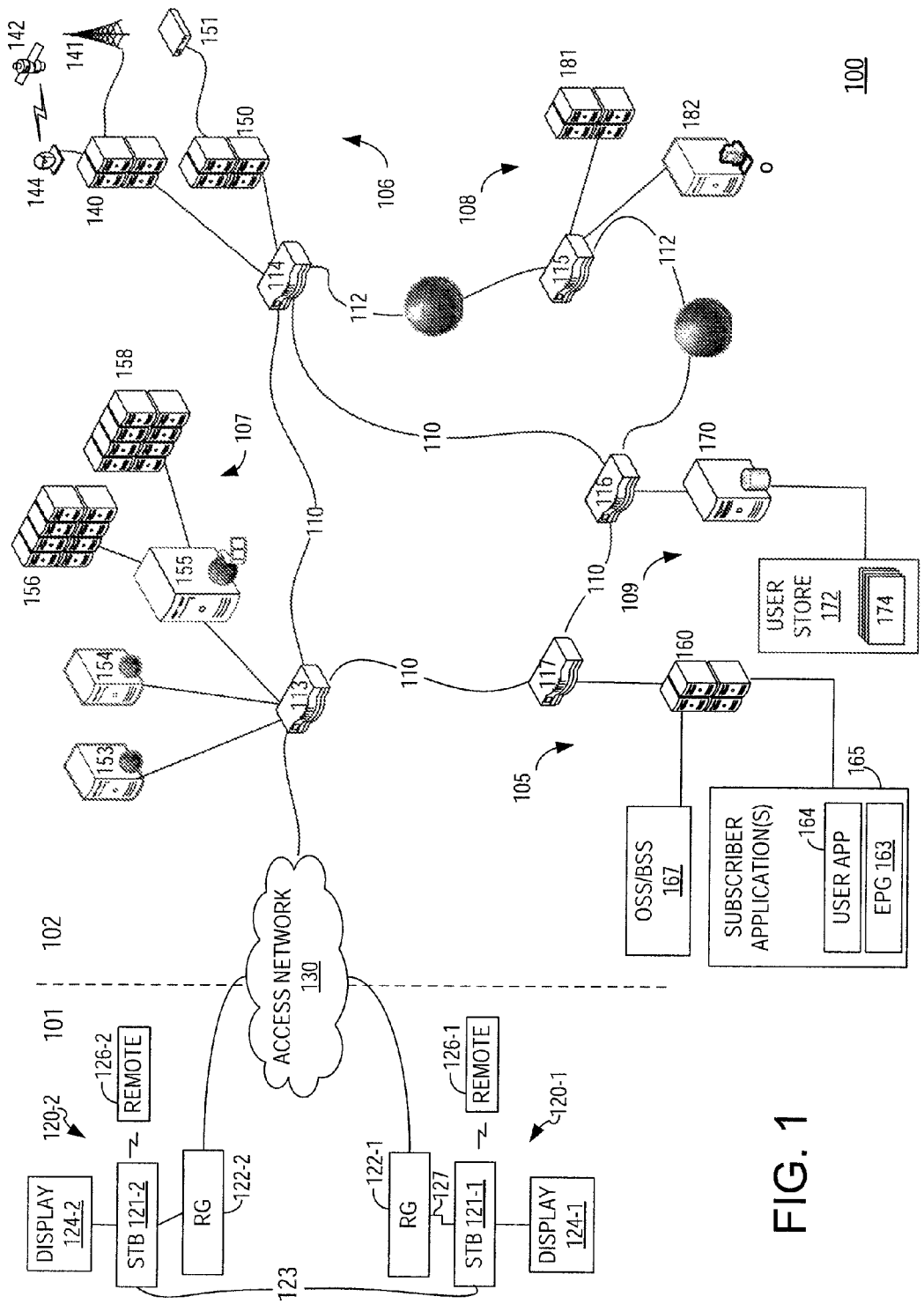
FIG. 1 illustrates selected elements of an embodiment of an Internet Protocol Television system.

In one aspect, disclosed embodiments of a method or service for enabling a subscriber to control access to multimedia content in a multimedia distribution network include provisioning the network with an access control application enabled to respond to an invocation by a member of a subscriber class such as parents by enabling at least one subscriber class function. The subscriber class function enables the subscriber class member to define an access restriction for members of a controlled class such as children. The application responds to being invoked by a member of the controlled class by enabling the controlled class member to access content not subject to the defined restrictions and permitting the controlled class member to define preferences from content not subject to the defined restrictions. The defined preferences are presented to the controlled class member for selection.

The application may present a main page interface in response to a power on event and permit a subscriber class member to transition from the main page interface to a live television state. The application might, however, prevent a controlled class member from transitioning from the main page interface to the live television state. The application may distinguish between subscriber class members and controlled class members by presenting at least one authentication query including, for example, a password.

The definable preferences for the controlled class member may include TV channel preferences and an interactive games preference. The subscriber class function enables the subscriber class member to define channel restrictions, program rating restrictions, elapsed viewing time restrictions, and monetary charge restrictions.

In another aspect, disclosed embodiments of a computer program product include computer executable instructions, stored on a computer readable medium, for controlling access to multimedia content distributed via a multimedia content distribution network where the instructions include instructions to present a main page interface including a first user selectable icon, respond to a user's selection of the first icon by performing an authentication sequence to determine whether the user is a member of a controlling class, respond to determining that the user is a member of the controlling class by presenting a setup interface to the controlling class user wherein the setup interface includes at least one user selectable icon to define a content access restriction, and respond to a request for content by determining if the requestor is a controlling class member and, if not, granting the content request subject to the defined content access restriction.

In still another aspect, embodiments of an application server in a multimedia distribution network are disclosed where the disclosed application server is enabled to serve a content access restriction application to a network subscriber. The access restriction application enables the subscriber to define access restrictions for members of a controlled class and wherein the application further enables members of the controlled class to define content preferences. The application may be operable to identify controlled class members using an authentication sequence. The application is operable to enable the subscriber to define various restrictions including channel restrictions, program rating restrictions, elapsed viewing time restrictions, and monetary charge restrictions.

Distribution of multimedia content, including television and video on-demand content, via a wide area network encompassing multiple subscribers or end users is well known. Some multimedia distribution networks including, for example traditional coaxial-based "cable" networks, continuously distribute or "push" a composite signal that includes all or a large number of the channels offered. The different channels are modulated onto corresponding frequency bandwidths within the composite signal. A tuner within a set top box, television, or other receiver selects a channel from the composite signal to play or record. Many of these composite signal networks are largely unidirectional and highly proprietary.

In contrast to composite signal networks, other networks including, for example, Internet Protocol Television (IPTV) systems may distribute one or a relatively small number of channels to a user at any given time based on the needs of the user. As suggested by their name, IPTV networks leverage pervasive network, technologies, standards, and infrastructure including, to some extent the Internet and the Internet Protocol (IP). In some IPTV networks, content is provided to the user over a physical connection that includes the "local loop" or "last mile" of a conventional telephone system. In these implementations, a subscriber's telephone lines may be used in combination with a residential gateway (RG), a digital subscriber line (DSL) modem to provide basic network communication functionality. A set-top box (STB) or other similar device connected to the RG provides functionality needed to decode video streams provided via the network and format resulting contents for display on a digital television, monitor, or other similar display device.

The inherent bidirectionality and the pervasiveness of the network technologies underlying IPTV offer the prospect of greater interactivity and a more flexible, extensible, and diverse set of features IPTV networks are particularly suited for deploying network based applications and features.

In the following description, details are set forth by way of example to provide a thorough explanation of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred collectively as widgets 102 and any one of which may be referred to generically as a widget 102.

Before describing details of applications, disclosed herein, for use in conjunction with a multimedia content distribution network, selected aspects of the network and selected devices used to implement the network are described to provide context for at least some implementations.

Television programs, video on demand, radio programs including music programs, and a variety of other types of multimedia content may be distributed to multiple subscribers over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a relatively large number of multimedia content channels (also referred to herein as "channels"), each occupying a different frequency band or channel, through a coaxial cable, a fiber-optic cable, or a combination of the two. The enormous bandwidth required to transport simultaneously large numbers of multimedia channels is a source of constant challenge for cable-based providers. In these types of networks, a tuner within a STB, television, or other form of receiver, is required to select a channel from the mixed signal for playing or recording. A subscriber wishing to play or record multiple channels typically needs to have distinct tuners for each desired channel. This is an inherent limitation of cable networks and other mixed signal networks.

In contrast to mixed signal networks, IPTV (Internet Protocol Television) networks generally distribute content to a subscriber only in response to a subscriber request so that, at any given time, the number of content channels being provided to a subscriber is relatively small, e.g., one channel for each operating television plus possibly one or two channels for recording. As suggested by the name, IPTV networks typically employ Internet Protocol (IP) and other open, mature, and pervasive networking technologies. Instead of being associated with a particular frequency band, an IPTV television program, movie, or other form of multimedia content is a packet-based stream that corresponds to a particular network address, e.g., an IP address. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an IP or analogous type of network address that is associated with the desired channel.

IPTV may be implemented, at least in part, over existing infrastructure including, for example, existing telephone lines, possibly in combination with customer premise equipment (CPE) including, for example, a digital subscriber line (DSL) modem in communication with a set-top box (STB), a display, and other appropriate equipment to receive multimedia content from a network and convert such content into usable form. In some implementations, a core portion of an IPTV network is implemented with fiber optic cables while the so-called last mile may include conventional unshielded twisted pair copper cables.

IPTV networks support bidirectional (i.e., two-way) communication between a subscriber's CPE and a service provider's equipment. Bidirectional communication allows a service provider to deploy advanced features, such as video-on-demand (VoD), pay-per-view, advanced programming information including sophisticated and customizable programming guides, and the like. Bidirectional networks may also enable a service provider to collect information related to a subscriber's preferences, whether for purposes of providing preference based features to the subscriber, providing potentially valuable information to service providers, or potentially lucrative information to content providers and others.

Because they are rooted in historically computer-based networking, IPTV networks are generally more adept at offering features that extend traditional television including, for example, networked interactive gaming and other network hosted applications.

Referring now to the drawings, FIG. 1 illustrates selected aspects of an embodiment of a multimedia content distribution network (MCDN) 100. MCDN 100 as shown may be generally divided into a client side 101 and a service provider side 102, sometimes also referred to simply as a server side, 102. The client side 101 includes all or most of the resources depicted to the left of access network 130 while the server side encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a subscriber's home or business to a local exchange. In these embodiments, the physical layer of access network 130 may include twisted pair copper cables or fiber optics cables employed either as fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

In other embodiments, access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some of these embodiments, private network 110 includes a fiber optic wide area network (WAN), referred to herein as the fiber backbone, and one or more video hub offices (VHOs). In large scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by subscribers served by the regional VHO. The hierarchical arrangement of VHOs, in addition to facilitating localized or regionalized content provisioning, may conserve scarce and valuable bandwidth by limiting the content that is transmitted over the core network and injecting regional content "downstream" from the core network.

Segments of private network 110 as shown in FIG. 1 are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an applications switch 117. In addition to providing routing/switching functionality, switches 113 through 117 preferably include hardware or firmware firewalls, not depicted, that maintain the security and privacy of network 110. Other portions of MCDN 100 communicate over a public network 112, including, for example, the Internet or other type of web-network where the public network 112 is signified in FIG. 1 by the world wide web icon.

As shown in FIG. 1, the client side 101 of MCDN 100 depicts two of a potentially large number of client side resources referred to herein simply as client(s) 120. Each client 120 as shown includes an STB 121, an RG 122, a display 124, and a remote control device 126. In the depicted embodiment, STB 121 communicates with server side devices through access network 130 via RG 122.

RG 122 may include elements of a broadband modem such as a DSL modem, as well as elements of a router and/or access point for an Ethernet or other suitable local area network (LAN) 127. In this embodiment, STB 121 is a uniquely addressable Ethernet compliant device. In some embodiments, display 124 may be any NTSC and/or PAL compliant display device. Both STB 121 and display 124 may, but do not necessarily include any form of conventional frequency tuner.

Remote control device 126 communicates wirelessly with STB 121 using an infra red (IR) or RF signal. IR-based remote control devices are economical but limited to line of sight operation whereas RF-based remote control devices are omni-directional, but more expensive to implement and more demanding in terms of power consumption, which is an important consideration for a battery based device.

In IPTV compliant implementations of MCDN 100, the clients 120 are operable to receive packet-based multimedia streams from access network 130 and process the streams for presentation on display 124. In addition, clients 120 are network-aware systems that may facilitate bidirectional networked communications with server side 102 resources to facilitate network hosted services and features. Because clients 120 are operable to process multimedia content streams while simultaneously supporting more traditional web-like communications, clients 120 may support or comply with a variety of different types of network protocols including streaming protocols such as RDP (reliable datagram protocol) over UDP/IP (user datagram protocol/internet protocol) as well as more conventional web protocols such as HTTP (hypertext transport protocol) over TCP/IP (transport control protocol).

The server side 102 of MCDN 100 as depicted in FIG. 1 emphasizes network capabilities including application resources 105, which may or may not have access to database resources 109, content acquisition resources 106, content delivery resources 107, and OSS/BSS resources 108.

Before distributing multimedia content to subscribers, MCDN 100 must first obtain multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down linked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a video on demand (VoD) acquisition server 150. VoD acquisition server 150 receives content from one or more VoD sources that may be external to the MCDN 100 including, as examples, discs represented by a DVD player 151, or transmitted feeds (not shown). VoD acquisition server 150 may temporarily store multimedia content for transmission to a VoD delivery server 158 in communication with client-facing switch 113.

After acquiring multimedia content, acquisition resources 106 may transmit acquired content over private network 110, for example, to one or more servers in content delivery resources 107. Prior to transmission, live acquisition server 140 may encode acquired content using, e.g., MPEG-2, H.263, a WMV (Windows Media Video) family codec, or another suitable video codec. Encoding acquired content is desirable to compress the acquired content to preserve network bandwidth and network storage resources and, optionally, to provide encryption for securing the content. VoD content acquired by VoD acquisition server 150 may be in a compressed format prior to acquisition and further compression or formatting prior to transmission may be unnecessary and/or optional.

Content delivery resources 107 as shown in FIG. 1 are in communication with private network 110 via client facing switch 113. In the depicted implementation, content delivery resources 107 include a content delivery server 155 in communication with a live or real-time content server 156 and a VoD delivery server 158. For purposes of this disclosure, the use of the term "live" or "real-time" in connection with content server 156 is intended primarily to distinguish the applicable content from the content provided by VoD delivery server 158. The content provided by a VoD server is sometimes referred to as time-shifted content to emphasize the ability to obtain and view VoD content substantially without regard to the time of day or day of week.

Content delivery server 155, in conjunction with live content server 156 and VoD delivery server 158, responds to subscriber requests for content by providing the requested content to the subscriber. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver, e.g., STB 121 of client 120, where the content is parsed from individual packets and re-assembled into multimedia content suitable for processing by a set top box decoder.

Subscriber requests received by content delivery server 155 include an indication of content that is being requested. In some embodiments, this indication includes an IP address associated with the desired content. For example, a particular local broadcast television station may be associated with a particular channel and the feed for that channel may be associated with a particular IP address. When a subscriber wishes to view the station, the subscriber may interact with remote control 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request by making a streaming video signal accessible to the subscriber. Content delivery server 155 may employ unicast and broadcast techniques when making content available to a subscriber. In the case of multicast, content delivery server 155 employs a multicast protocol to deliver a single originating stream to multiple clients. When a new subscriber requests the content associated with a multicast stream, there is generally latency associated with updating the multicast information to reflect the new subscriber as a part of the multicast group. To avoid exposing this undesirable latency to the subscriber, content delivery server 155 may temporarily unicast a stream to the requesting subscriber. When the subscriber is ultimately enrolled in the multicast group, the unicast stream is terminated and the subscriber receives the multicast stream. Multicasting desirably reduces bandwidth consumption by reducing the number of streams that must be transmitted over the access network 130 to clients 120.

As illustrated in FIG. 1, a client-facing switch 113 provides a conduit between subscriber side 101, including client 120, and server side 102. Client-facing switch 113 as shown is so named because it connects directly to the client 120 via access network 130 and it provides the network connectivity of IPTV services to consumers' locations.

To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, real-time transport protocol (RTP), real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188 byte transport packets, for example. Client-facing switch 113 as shown is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen set-top boxes, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VoD content, and other services. If client gateway 153 cannot verify subscriber information for STB 121, for example, because it is connected to an unauthorized twisted pair or residential gateway, client gateway 153 may block transmissions to and from STB 121 beyond the private access network 130.

MCDN 100 as depicted includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an electronic programming guide (EPG) application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a subscriber. User application 164 is illustrated in FIG. 1 to emphasize the ability to extend the network's capabilities by implementing a networked hosted application. Because the application resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected.

As shown in FIG. 1, a database switch 116 connected to applications switch 117 provides access to database resources 109. Database resources 109 includes a database server 170 that manages a system storage resource 172, also referred to herein as user store 172. User store 172 as shown includes one or more user profiles 174 where each user profile includes account information and may include preferences information that may be retrieved by applications executing on application server 160 including subscriber application 165.

MCDN 100 as shown includes an OSS/BSS resources 108 including an OSS/BSS switch 115. OSS/BSS switch 115 as shown facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

Figure 2:
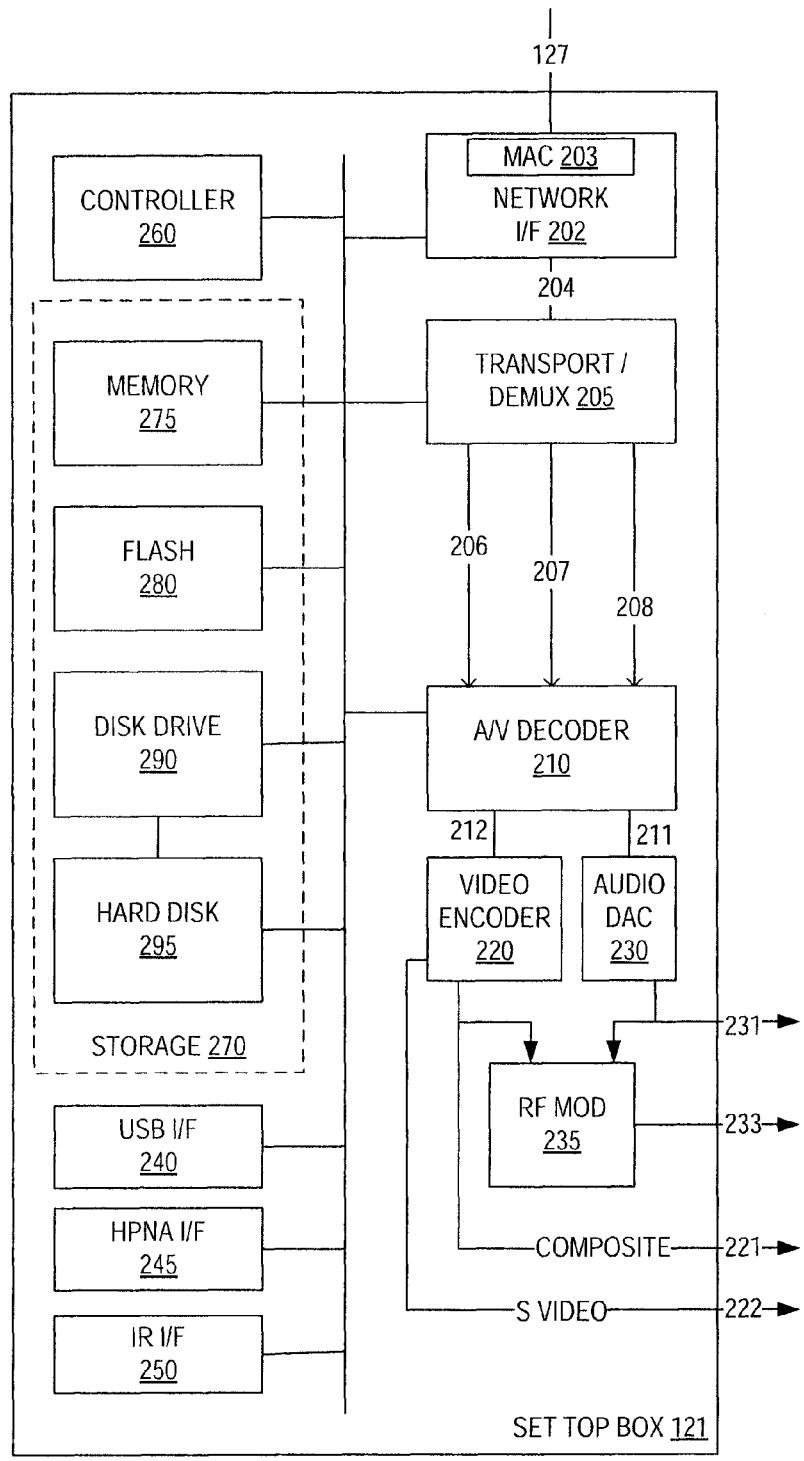
FIG. 2 illustrates selected elements of an embodiment of a set top box used in the system of FIG. 1.

Turning now to FIG. 2, selected components of an embodiment of the STB 121 in the IPTV client 120 of FIG. 1 are illustrated. Regardless of the specific implementation, of which STB 121 as shown in FIG. 2 is but an example, an STB 121 suitable for use in an IPTV client includes hardware and/or software functionality to receive streaming multimedia data from an IP-based network and process the data to produce video and audio signals suitable for delivery to an NTSC, PAL, or other type of display 124. In addition, some embodiments of STB 121 may include resources to store multimedia content locally and resources to play back locally stored multimedia content.

In the embodiment depicted in FIG. 2, STB 121 includes a general purpose processing core represented as controller 260 in communication with various special purpose multimedia modules. These modules may include a transport/de-multiplexer module 205, an A/V decoder 210, a video encoder 220, an audio DAC 230, and an RF modulator 235. Although FIG. 2 depicts each of these modules discretely, STB 121 may be implemented with a system on chip (SoC) device that integrates controller 260 and each of these multimedia modules. In still other embodiments, STB 121 may include an embedded processor serving as controller 260 and at least some of the multimedia modules may be implemented with a general purpose digital signal processor (DSP) and supporting software.

Regardless of the implementation details of the multimedia processing hardware, STB 121 as shown in FIG. 2 includes a network interface 202 that enables STB 121 to communicate with an external network such as LAN 127. Network interface 202 may share many characteristics with conventional network interface cards (NICs) used in personal computer platforms. For embodiments in which LAN 127 is an Ethernet LAN, for example, network interface 202 implements level 1 (physical) and level 2 (data link) layers of a standard communication protocol stack by enabling access to the twisted pair or other form of physical network medium and supporting low level addressing using MAC addressing. In these embodiments, every network interface 202 includes a globally unique 48-bit MAC address 203 stored in a ROM or other persistent storage element of network interface 202. Similarly, at the other end of the LAN connection 127, RG 122 has a network interface (not depicted) with its own globally unique MAC address.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport/demux 205.

The digital multimedia stream 204 is a sequence of digital information that includes interlaced audio data streams and video data streams. The video and audio data contained in digital multimedia stream 204 may be referred to as "in-band" data in reference to a particular frequency bandwidth that such data might have been transmitted in an RF transmission environment. Multimedia stream 204 may also include "out-of-band" data which might encompass any type of data that is not audio or video data, but may refer in particular to data that is useful to the provider of an IPTV service. This out-of-band data might include, for example, billing data, decryption data, and data enabling the IPTV service provider to manage IPTV client 120 remotely.

Transport/demux 205 as shown is operable to segregate and possibly decrypt the audio, video, and out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 121 including an IR interface 250 suitable for use with an IR remote control unit (not shown) and a front panel interface (not shown).

A/V decoder 210 processes digital audio, video, and out-of-band streams 206, 207, and 208 to produce a native format digital audio stream 211 and a native format digital video stream 212. A/V decoder 210 processing may include decompression of digital audio stream 206 and/or digital video stream 207, which are generally delivered to STB 121 as compressed data streams. In some embodiments, digital audio stream 206 and digital video stream 207 are MPEG compliant streams and, in these embodiments, A/V decoder 210 is an MPEG decoder.

The digital out-of-band stream 208 may include information about or associated with content provided through the audio and video streams. This information may include, for example, the title of a show, start and end times for the show, type or genre of the show, broadcast channel number associated with the show, and so forth. A/V decoder 210 may decode such out-of-band information. MPEG embodiments of A/V decoder 210 support a graphics plane as well as a video plane and at least some of the out-of-band information may be incorporated by A/V decoder 210 into its graphics plane and presented to the display 124, perhaps in response to a signal from a remote control device.

The native format digital audio stream 211 as shown in FIG. 2 is routed to an audio DAC 230 to produce an audio output signal 231. The native format digital video stream 212 is routed to an NTSC/PAL or other suitable video encoder 220, which generates digital video output signals suitable for presentation to an NTSC or PAL compliant display device 204. In the depicted embodiment, for example, video encoder 220 generates a composite video output signal 221 and an S video output signal 222. An RF modulator 235 receives the audio and composite video outputs signals 231 and 221 respectively and generates an RF output signal 221 suitable for providing to an analog input of display 204.

In addition to the multimedia modules described, STB 121 as shown includes and various peripheral interfaces. STB 121 as shown includes, for example, a USB interface 240 and a local interconnection interface 245. Local interconnection interface 245 may, in some embodiments, support the HPNA or other form of local interconnection 123 shown in FIG. 1.

The illustrated embodiment of STB 121 includes storage resources 270 that are accessible to controller 260 and possibly one or more of the multimedia modules. Storage 270 may include DRAM or another type of volatile storage identified as memory 275 as well as various forms of persistent or nonvolatile storage including flash memory 280 and/or other suitable types of persistent memory devices including ROMs, EPROMs, and EEPROMs. In addition, the depicted embodiment of STB 121 includes a mass storage device in the form of one or more magnetic hard disks 295 supported by an IDE compliant or other type of disk drive 290. Embodiments of STB 121 employing mass storage devices may be operable to store content locally and play back stored content when desired.

Some embodiments emphasize a particular implementation of the subscriber application 165 referred to in FIG. 1. In these embodiments, application 165 may be implemented as an application, designated by reference numeral 300 in FIG. 3, for controlling access to multimedia content. In these embodiments, the application 300 may be implemented as a set of computer executable instructions stored on a computer readable medium. The instructions, when executed, enable subscribers to control access to multimedia content for a class of users, referred to herein as the controlled class. The controlled class may be children, for example.

Figure 3:
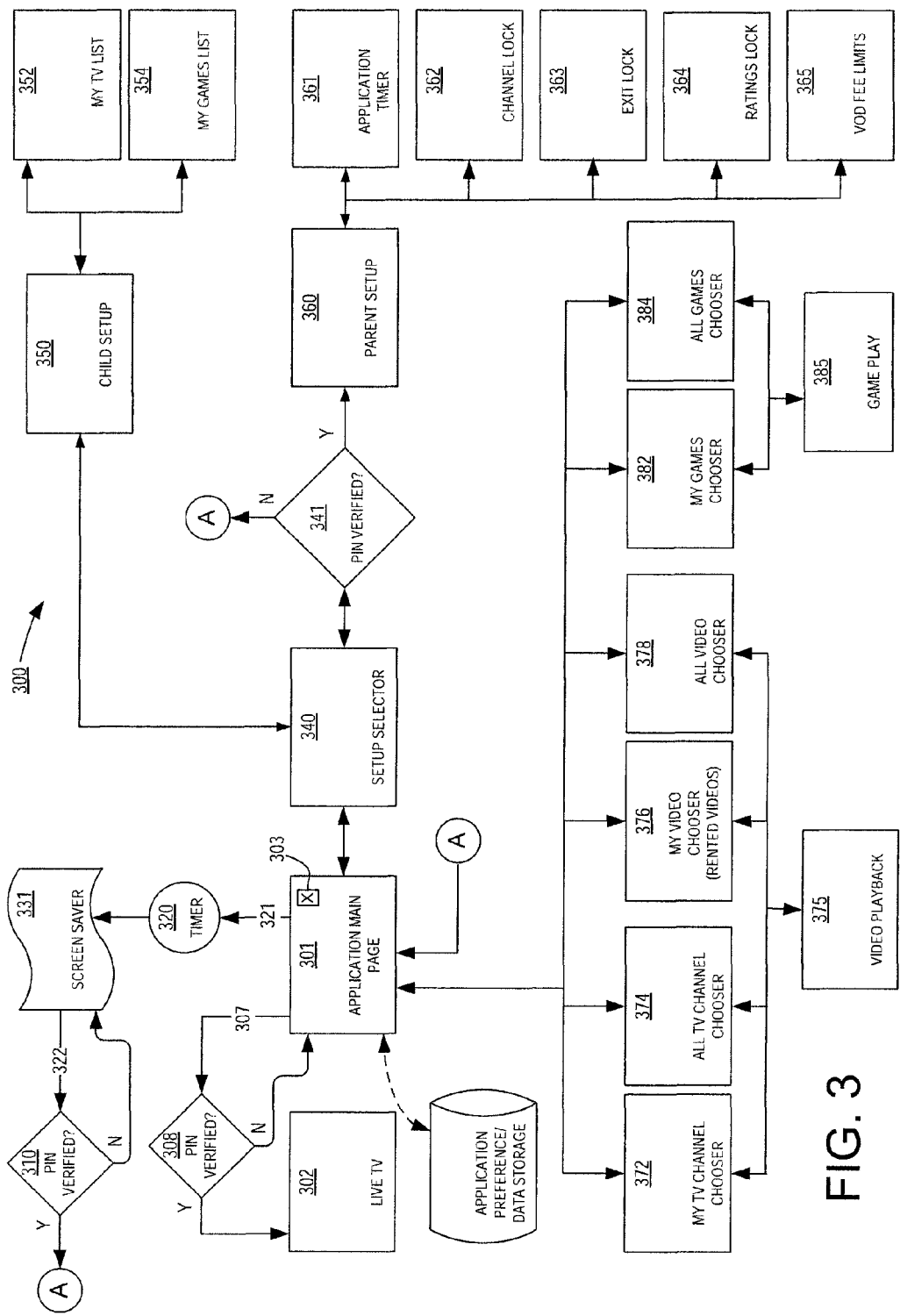
FIG. 3 is a conceptual representation of an embodiment of an application for controlling content access while also facilitating and enhancing the network experience of a subscriber's children.

Referring now to FIG. 3, a conceptual representation of selected elements of an embodiment of a content access control application 300 are depicted. In some embodiments, application 300 integrates a multiple-tiered access control hierarchy with user-friendly interfaces and user-specifiable preferences that facilitate the selectable provisioning of multimedia content to a subscriber. Although the depicted embodiments of application 300 are discussed in the context of an application suitable for use in the context of a parent/child paradigm, other embodiments may apply at least some of the described aspects to other environments.

As depicted in FIG. 3, application 300 includes an application main page state 301. Application main page state 301, as suggested by its name, may represent as a state in which a web page or web like page is presented to a user. In some embodiments, main page state 301 is a default state that the user enters whenever a television or other form of client 120 is powered on, booted, reset, or otherwise "started". Main page state 301 may include or be associated with a default setting 303 for this purpose. If the default setting 303 is checked or otherwise asserted, main page state 301 is entered in response to a start event. If the default setting 303 is not checked, client 120 may respond to a startup event by transitioning to another environment, an example of which would be the live TV state 302. The particular screen that is presented to the user in live TV state 302 may be a live screen corresponding to a default channel preference, a live screen of the last channel accessed, a live screen of an electronic programming guide (EPG), or the like.

For the remainder of this description, it is assumed that default setting 303 is asserted and that application 300 transitions a user to application main page state 301 following a start event. At least some embodiments of application main page state 301 present an interactive menu referred to herein as application main page 400, described in greater detail below with respect to FIG. 4, that application 300 presents to the user. In some embodiments, application main page 301 facilitates differentiated or tiered access privileges that provide a first class of users or subscribers, e.g., parents or guardians, referred to herein as the controlling class, with resources to control the access privileges of one or more other classes of users, e.g., children, referred to herein as the controlled class. The access privileges controlled by the first class of users may include content-based access controls, time-based access controls, a combination thereof, or other suitable controls.

Application 300 as depicted in FIG. 3 includes multiple alternative transitions from main page state 301, in which application 300 displays application main page 400 to the user. In one embodiment, for example, application 300 incorporates a time-based control that enables the controlling class to limit the access of the controlled class based on the amount of time the controlling class has been viewing content. As an example, a controlling class user may limit the amount of time that a member of the controlled class is able to access multimedia content to one or two hours per day. To support such a capability, application 300 as depicted in FIG. 3 includes a timer resource 320. Timer resource 320 is enabled to record or monitor the passage of time. Timer resource 320 may be a hardware-based resource such as a crystal controlled oscillator or a software based clock. Alternatively, timer resource 320 might be a software-based timer. Timer resource 320, in some embodiments, might determine a current time by periodically polling a hardware based mechanism or a network parameter. In embodiments of IPTV system 100, for example, timer resource 320 might be enabled to communicate with an electronic programming guide to determine the time of day.

Regardless of the specific implementation, timer resource 320 and application 300 are operable to initiate a transition 321 of application 300 from application main page state 301 to a timeout state, represented in FIG. 3 by a timeout state 331 in which a timeout message and/or a screen saver are displayed. Although timer resource 320 is shown in FIG. 3 as being directly connected to application main page state 301, timer resource 320 may be implemented with an interrupt or other technique to provide an asynchronous transition from any state to timeout state 361 when timer resource 320 expires.

Figure 4:
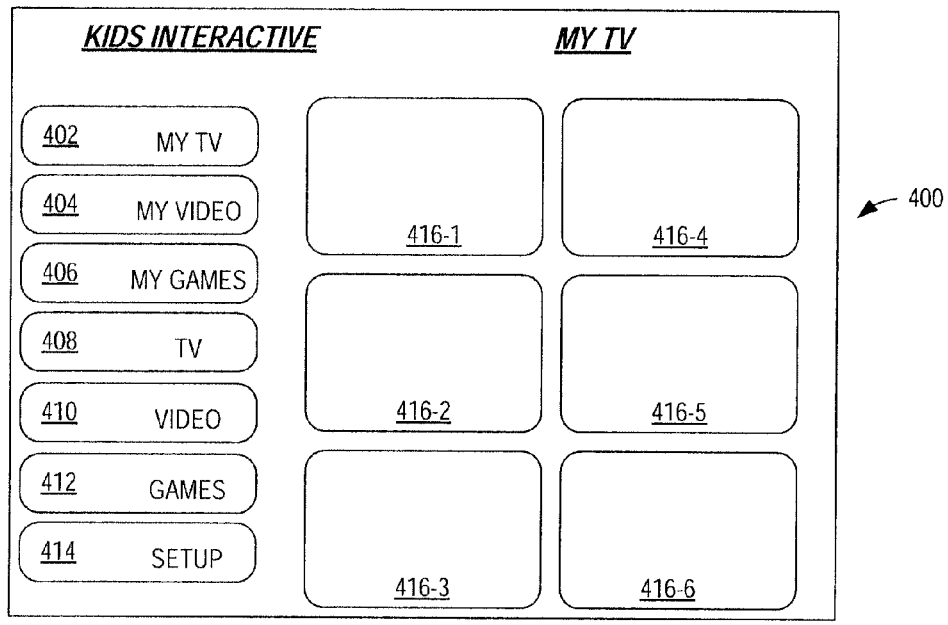
FIG. 4 is a conceptual representation of an embodiment of a user interface suitable for the application of FIG. 3.

After a time-based access restriction is invoked, application 300 will respond to an event 322 such as a signal from a remote control 126, by querying the user for a PIN and/or other authentication information. If (block 310) the user is able to authenticate himself or herself as a user authorized to override a timer restriction, the depicted embodiment of application 300 transitions back to the main page state 301 and displays the application main page 400 (FIG. 4). If the user is unable to authenticate, application 300 transitions back to the timeout state 361.

The depicted embodiment of application 300 is operable to transition from application main page state 301 to a live TV state 302. In some embodiments, including the embodiment represented by FIG. 3, application 300 requires authentication before transitioning from application main page state 301 to live TV state 302. In response to an event 307 indicating that the user desires to enter the live TV state 302, application 300 queries the user for a PIN and/or other form of authentication. If the user satisfies the requested authentication, application 300 transitions to live TV state 302, where the user is able to view live TV content. If the user is not able to authenticate the request to transition to live TV, application 300 returns to the application main page state 301.

Thus, application 300 as depicted in FIG. 3 incorporates authentication to control a transition from application main page state 301 to a live TV state 302. Application 300 as shown also incorporates the concept of a user determinable time limit, exemplified by timer resource 320, that permits the controlled class of users access to at least some multimedia content for a specified duration. After the duration is exceeded, further access to content requires authentication. In various embodiments, the limits associated with timer resource 320 may be specified in various formats. For example, the duration limit may be specified in terms of hours per 24 hour interval, hours per 168 hour interval (per one week interval), and so forth. The duration may be stored as a field or variable in a network-based user profile such as user profile 174 (FIG. 1) or other appropriate data structure.

When in the application main page state 301, the depicted embodiment of application 300 may present the user with various selectable entries for enabling or performing various interactions. The actions that might be supported from main page state 301 include viewing live TV or other multimedia content, viewing recorded multimedia content, and playing interactive videos or games. All of these actions are supported by application 300 as shown.

In an embodiment depicted in FIG. 4, application main page 400 includes buttons or links 402 through 414 that facilitate controlled or controllable access to live multimedia content, recorded content, and interactive content. Specifically, the embodiment of main page 400 as shown in FIG. 4, includes a set of buttons/links for general access to live content, stored content, and interactive content and a set of buttons/links for personalized or "favorites" access to live content, stored content, and interactive content. Each of the favorites buttons is indicated by the word "MY".

For example, main page 400 as shown includes a button or link 402 entitled "MY TV," which facilitates a transition to a live TV content state, referred to in FIG. 3 as MY TV CHANNEL CHOOSER state 372, by presenting the user with a definable subset of live TV channel choices. Similarly, main page 400 as shown includes a "MY VIDEO" link 404 that facilitates a transition to a stored content state, referred to in FIG. 3 as MY VIDEO CHOOSER state 376, by presenting the user with a definable subset of stored video content. Stored video content may include content stored locally, i.e., on a storage resource 172 of STB 121, using DVR functionality as well as content streamed from or otherwise acquired from a network server using video on demand (VOD) services. Still furthermore, main page 400 as shown includes a MY GAMES link 406. MY GAMES link 406 facilitates a transition to a MY GAMES CHOOSER state 382 by presenting the user with a definable subset of interactive games to play.

Main page 400 as shown further includes a TV link 408, a video link 410, and a GAMES link 412. In contrast to their respective "MY" links, the general links 408, 410, and 412 facilitate transitions to "all" live, stored, or interactive content choose states 374, 376, and 378 respectively in which a superset of the live, stored, and interactive choices available via the respective MY links are presented. In addition, application 300

In some embodiments, a member of a controlling class of user may place restrictions on the content accessible to a viewer who asserts the general TV link 408 and/or the general video link 410. In one such example, a member of a controlling class of user can access a controlling class setup state and define a subset of all available live TV content as the live TV content accessible via general TV link 408. Similarly, the user can define a subset of all available video content as the video content accessible via general video link 410. This feature would enable the controlling class members to limit the "domain" of content from which controlled class members could access content or define favorites.

Thus, main page 400 as shown is operable to enable access to live content, stored content, and interactive content on a selective or nonselective basis. By providing "MY" links for each class of content, i.e., live, stored, and interactive, the depicted embodiment of main page 400 provides resources that assist, for example, a child in selecting content while also providing a means for enabling a parent or guardian to limit the content choices available to the child.

The embodiment of application main page 400 shown in FIG. 4, further includes a SETUP link 414 and a set of picture in picture (PIP) or viewport windows 416. The SETUP link/button 414 is described below with respect to FIG. 5. The viewports windows 416, when included, provide a mechanism to facilitate the selection of content by providing the user with a "thumbnail" of the content currently playing on a selected set of available stations. The selected set of available stations might, for example, include a list of stations associated with the MY TV link 402.

Figure 5:
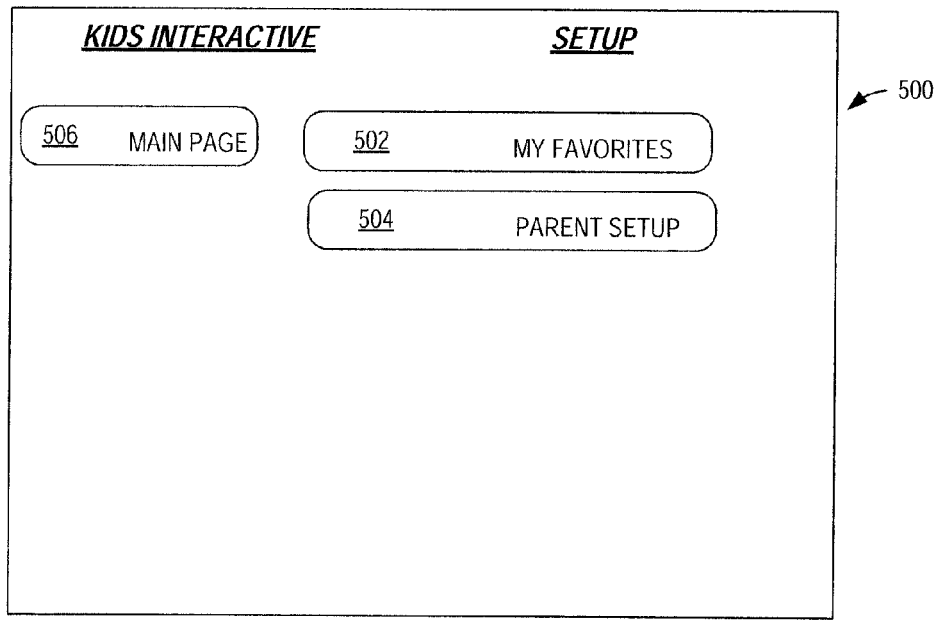
FIG. 5 is a conceptual representation of an embodiment of a second screen in the user interface of FIG. 4.

Returning to FIG. 3, the depicted embodiment of application 300 transitions from main page state 301 to a setup state 340 in response to selection of a setup link 414 from main page 400 as shown in FIG. 4. The transition to setup state 340 may include displaying a setup page 500, an exemplary implementation of which is shown in FIG. 5. The depicted embodiment of setup page 500 includes a main page link 506, a MY FAVORITES link 502, and a parent setup link 504. Assertion of main page link 506 by the user causes application 300 to transition back to the main page state 301.

Assertion of MY FAVORITES link 502 transitions application 300 to a child setup state 350 as shown in FIG. 3. From the child setup page 350, application 300 may transition to a MY TV LIST state 352 or to a MY GAMES LIST state 354. MY TV LIST state 352 enables the user to select from a menu of content channels for including in the MY TV LIST. The content channels that are available to a user in MY TV LIST state 352 may be influenced or limited by values stored under parent setup state 360 as described below. If, for example, a user with authority to modify parameters under parent setup 360, elects to block one or more channels using channel block state 362, the blocked channels may not be available to a user who enters childe setup state 350 and MY TV list 352.

The MY GAMES LIST state 354 enables users to define a list of interactive games for subsequent selection. Like the MT TV LIST, the list of game titles available for inclusion in a user's MY GAMES LIST may be influenced by one or more parameters associated with parent setup 360. If, for example, a parent or other authorized user enables one or more ratings locks via ratings lock state 364, the list of game titles available for selection by a child or other user in MY GAMES LIST state 354 may not include the titles excluded by the ratings lock.

When a child or other user accesses and enters information in MY TV LIST 352 and/or MY GAMES LIST 354, the list of titles entered becomes available to the user when the user subsequently transitions to either the MY TV CHANNEL chooser state 372 or the MY GAMES chooser 382.

When a user attempts to transition application 300 from setup selector state 340 to parent setup state 360, application 300 as shown queries (block 341) the user for a password and/or other authentication information. If the user is able to authenticate himself or herself, application 300 as shown transitions to parent setup state 360. In this embodiment, PIN verification at block 341 provides a mechanism by which tiered or differing levels of access privileges may be used by two different classes of users including, for example, a children class of users and a parent class of users. If the user is unable to authenticate himself/herself in block 341, application 300 transitions back to main page state 301.

From parent setup stage 360, application 300 is operable to access a number of applications and/or data structures for control access of the controlled class members. These include, as examples, application timer 361 to set thresholds for activation of timer resource 320, channel lock 362 to indicate channels that will not be available to a controlled class member, exit lock 363 to define a setting preventing a controlled class member from transitioning from application main page state 301 to live TV state 302, a rating lock 364 to indicate one or more classes of programs, defined by ratings, that are not accessible to controlled class members, and video-on-demand fee limits to define thresholds for video-on-demand charges incurred by controlled class members 365.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. An access control method, comprising:
    responding to a power on event by determining a state of an access control setting associated with an access control application;
    responding to determining that the access control setting is asserted by:
        transitioning to a main page state and presenting a main page interface of the access control application, wherein the main page interface includes a plurality of selectable links providing controlled access to multimedia content, the plurality of selectable links including:
            a first television link;
            a my television link; and
            a setup link; and
        executing an authentication query to identify a class of a user in response to detecting a user request from the user;
        responding to detecting user selection of the first television link by transitioning to an all television choose state, wherein:
            a first subset of television content is available when the user is a controlled class user, wherein the first subset comprises a subset defined by a controlling class user; and
            all television content is available when the user is a subscriber class user; and
        responding to detecting user selection of the my television link by transitioning to a my television choose state, wherein:
            a first favorites subset of the first subset of television content is available when the user is a controlled class user, wherein the first favorites subset comprises a subset defined by the controlled class user; and
            a second favorites subset of all television content is available when the user is a subscriber class user, wherein the second favorites subset is defined by the subscriber class user; and
        responding to detecting user selection of the setup link by:
            transitioning to a parent setup state when the user is a subscriber class user, wherein the parent setup state enables the user to define favorites for the user and to define a domain from which a controlled class user may define favorites; and
            transitioning to a child setup state when the user is a controlled class user, wherein the child setup state enables the user to define favorites from the domain; and
    responding to determining that the access control setting is not asserted by:
        transitioning to a live television state; and
        responding to a subsequent user request for content by processing the subsequent user request without determining a class of the user.

2. The method of claim 1, further comprising:
    responsive to the authentication query failing to identify a class of user associated with the user, transitioning to the main page state.

3. The method of claim 1, wherein the first subset is defined based, at least in part, on a channel identification.

4. The method of claim 1, wherein the first subset is defined based, at least in part, on a rating associated with requested content.

5. The method of claim 1, wherein the first subset is defined based, at least in part, on whether an amount of time the user has been viewing content exceeds a predetermined limit.

6. The method of claim 5, further comprising:
    responding to an indication of an elapsed viewing time restriction by transitioning to a time out state; and
    displaying a timeout screen.

7. The method of claim 6, further comprising:
    permitting the subscriber class user to transition from the time out state to the main page interface; and
    preventing the controlled class user from transitioning from the time out state.

8. A non-transitory computer readable medium including stored program instructions that, when executed by a processor, perform operations comprising:
    responding to a power on event by determining a state of an access control setting;
    responding to determining that the access control setting is asserted by:
        transitioning to a main page state and presenting a main page interface, wherein the main page interface includes a plurality of selectable links providing controlled access to multimedia content, the plurality of selectable links including:
            a first television link;
            a my television link; and
            a setup link; and
        identifying a class of a user in response to detecting a user request from a user;
        responding to detecting user selection of the first television link by transitioning to an all television choose state, wherein:
            a first subset of television content is available when the user is a controlled class user, wherein the first subset comprises a subset defined by a controlling class user; and
            all television content is available when the user is a subscriber class user;
        responding to detecting user selection of the my television link by transitioning to a my television choose state, wherein:
            a first favorites subset of the first subset of television content is available when the user is a controlled class user, wherein the first favorites subset comprises a subset defined by the controlled class user;
            a second favorites subset of all television content is available when the user is a subscriber class user, wherein the second favorites subset is defined by the subscriber class user; and
        responding to detecting user selection of the setup link by:

transitioning to a parent setup state when the user is a subscriber class user, wherein the parent setup state enables the user to define favorites for the user and to define a domain from which a controlled class user may define favorites; and transition to a child setup state when the user is a controlled class user, wherein the child setup state enables the user to define favorites from the domain; and responding to determining that the access control setting is not asserted by:

transitioning to a live television state; and responding to a subsequent user request for content by processing the subsequent user request without determining a class of the user.

9. The computer readable medium of claim 8, wherein the operations include:

responsive failing to identify a class of user associated with the user, transitioning to the main page state.

10. The computer readable medium of claim 8, wherein the first subset is defined based on at least one of: a channel identification, a rating associated with requested content, and whether an amount of time the user has been viewing content exceeds a predetermined limit.

11. The computer readable medium of claim 8, wherein the operations include:

responding to an indication of an elapsed viewing time restriction by transitioning to a time out state; and displaying a timeout screen.

12. The computer readable medium of claim 11, wherein the operations include:

permitting the subscriber class user to transition from the time out state to the main page interface; and preventing the controlled class user from transitioning from the time out state.

13. An application server, comprising:

a processor; and a computer readable medium, accessible to the processor, including stored program instructions that, when executed by the processor, cause the processor to perform operations including:

responding to a power on event by determining a state of an access control setting;

responding to determining that the access control setting is asserted by:

transitioning to a main page state and presenting a main page interface, wherein the main page interface includes a plurality of selectable links providing controlled access to multimedia content, the plurality of selectable links including:

a first television link;

a my television link; and a setup link; and identifying a class of a user in response to detecting a user request from a user;

responding to detecting user selection of the first television link by transitioning to an all television choose state, wherein:

a first subset of television content is available when the user is a controlled class user, wherein the first subset comprises a subset defined by a controlling class user; and all television content is available when the user is a subscriber class user;

responding to detecting user selection of the my television link by transitioning to a my television choose state, wherein:

a first favorites subset of the first subset of television content is available when the user is a controlled class user, wherein the first favorites subset comprises a subset defined by the controlled class user;

a second favorites subset of all television content is available when the user is a subscriber class user, wherein the second favorites subset is defined by the subscriber class user; and responding to detecting user selection of the setup link by:

transitioning to a parent setup state when the user is a subscriber class user; and transition to a child setup state when the user is a controlled class user; and responding to determining that the access control setting is not asserted by:

transitioning to a live television state; and responding to a subsequent user request for content by processing the subsequent user request without determining a class of the user.

14. The application server of claim 13, wherein the operations include:

responsive failing to identify a class of user associated with the user, transitioning to the main page state.

15. The application server of claim 13, wherein the first subset is defined based on at least one of: a channel identification, a rating associated with requested content, and whether an amount of time the user has been viewing content exceeds a predetermined limit.

16. The application server of claim 13, wherein the operations include:

responding to an indication of an elapsed viewing time restriction by transitioning to a time out state; and displaying a timeout screen.

17. The application server of claim 16, wherein the operations include:

permitting the subscriber class user to transition from the time out state to the main page interface; and preventing the controlled class user from transitioning from the time out state.

* * * * *